US007107073B1

(12) United States Patent
Berthaud

(10) Patent No.: US 7,107,073 B1
(45) Date of Patent: Sep. 12, 2006

(54) COMMUNICATION DEVICE FORMING AN INTERFACE BETWEEN AN ELECTRICALLY COUPLED READ HEAD IN PARTICULAR WITH CONTACT, AND AN ELECTROMAGNETICALLY COUPLED CONTACTLESS DEVICE

(75) Inventor: Christophe Berthaud, Evilard (CH)

(73) Assignee: Swatch AG, Biel (CH)

( * ) Notice: Subject to any disclaimer, the term of this patent is extended or adjusted under 35 U.S.C. 154(b) by 340 days.

(21) Appl. No.: 10/111,194

(22) PCT Filed: Sep. 18, 2000

(86) PCT No.: PCT/EP00/09189

§ 371 (c)(1),
(2), (4) Date: Nov. 12, 2002

(87) PCT Pub. No.: WO01/31573

PCT Pub. Date: May 3, 2001

(30) Foreign Application Priority Data

Oct. 25, 1999 (EP) .................................. 99121238

(51) Int. Cl.
*H04B 1/38* (2006.01)
*H04M 1/00* (2006.01)
(52) U.S. Cl. ..................... 455/557; 455/558; 455/41.1; 455/420; 455/418; 455/419; 455/556.1; 340/870.02; 340/572.1
(58) Field of Classification Search ................ 455/557, 455/558, 556.1, 566, 418, 419, 870.02, 572.1, 455/41.1
See application file for complete search history.

(56) References Cited

U.S. PATENT DOCUMENTS

| 5,149,945 A | | 9/1992 | Johnson et al. |
| 5,440,449 A | * | 8/1995 | Scheer ........................ 361/686 |
| 5,608,606 A | * | 3/1997 | Blaney ........................ 361/686 |
| 5,659,800 A | * | 8/1997 | Zhang et al. .................. 710/62 |

(Continued)

FOREIGN PATENT DOCUMENTS

DE          40 28 966 A1        3/1992

(Continued)

*Primary Examiner*—Marceau Milord
(74) *Attorney, Agent, or Firm*—Sughrue Mion, PLLC

(57) ABSTRACT

The invention concerns a communication device (20) forming an interface between an electrically coupled reader (10), in particular with contact, and at least a radioelectrically coupled contactless device (30). The interface (20) comprises electronic coupling pads (24), in particular resistive contact pads, with corresponding coupling elements of the reader (10), and transmitting and/or receiving means for electromagnetic waves (26), in particular an antenna, designed to enable communication with the contactless electronic device (20). The interface (20) comprises in particular means (28) for managing data transfer between the contacts (24) and the antenna (26) so as to enable communication between the electrically coupled reader (10), requiring the insertion of a device with electrically coupled contacts, and the contactless electronic device (30). Preferably, the device (30) is arranged in a portable object capable of being fixed on part of the bearer, in particular a watch.

15 Claims, 1 Drawing Sheet

U.S. PATENT DOCUMENTS

| | | | |
|---|---|---|---|
| 5,761,624 A | * | 6/1998 | Mooney et al. ............. 455/558 |
| 5,768,163 A | * | 6/1998 | Smith, II .................... 708/105 |
| 5,881,149 A | * | 3/1999 | Weatherill ............. 379/433.02 |
| 6,085,112 A | * | 7/2000 | Kleinschmidt et al. .. 455/556.1 |
| 6,141,563 A | * | 10/2000 | Miller et al. ................ 455/558 |
| 6,219,732 B1 | * | 4/2001 | Henrie et al. ............... 710/301 |
| 6,262,824 B1 | * | 7/2001 | Sasaki et al. ............... 398/115 |
| 6,512,919 B1 | * | 1/2003 | Ogasawara ............. 455/422.1 |
| 6,577,861 B1 | * | 6/2003 | Ogasawara ................. 455/419 |
| 6,799,155 B1 | * | 9/2004 | Lindemann et al. .......... 703/24 |

FOREIGN PATENT DOCUMENTS

| | | |
|---|---|---|
| DE | 195 42 262 A1 | 5/1996 |
| WO | WO 95 19015 A1 | 1/1995 |
| WO | WO 99 34326 A1 | 7/1999 |

* cited by examiner

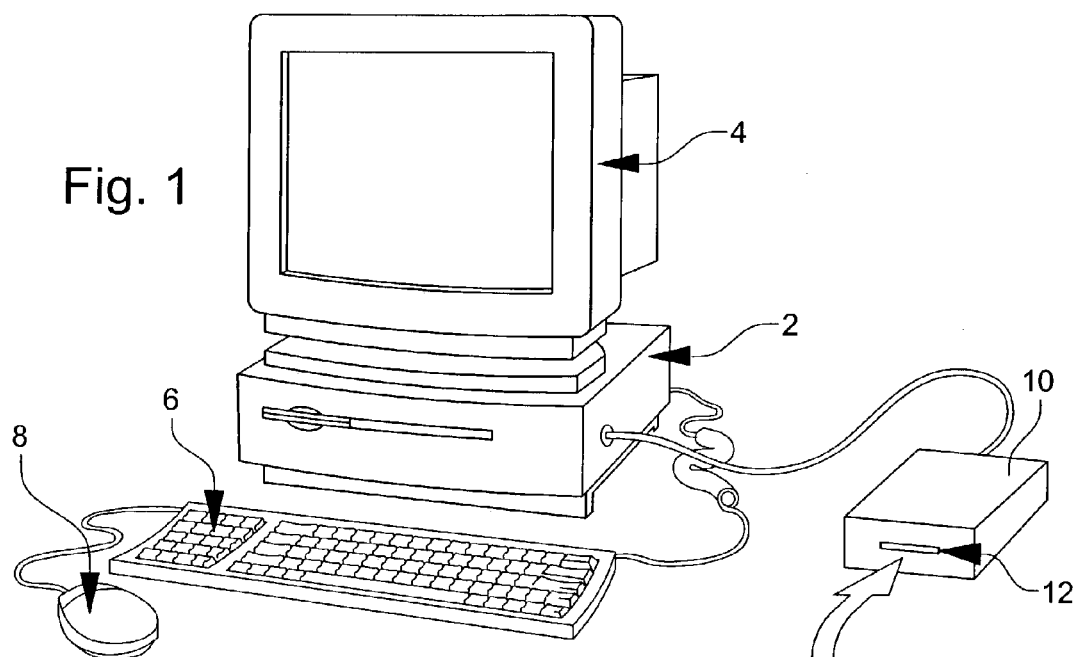
Fig. 1
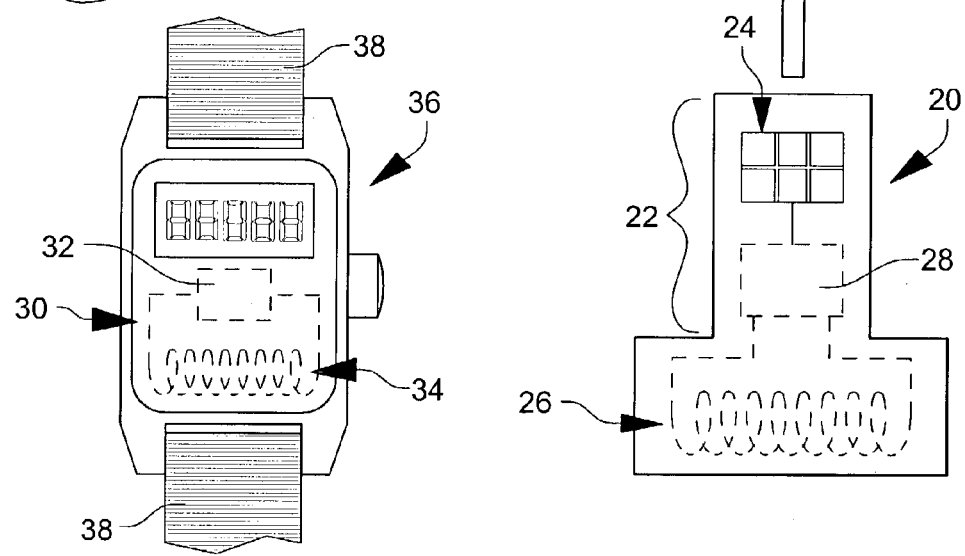
Fig. 2
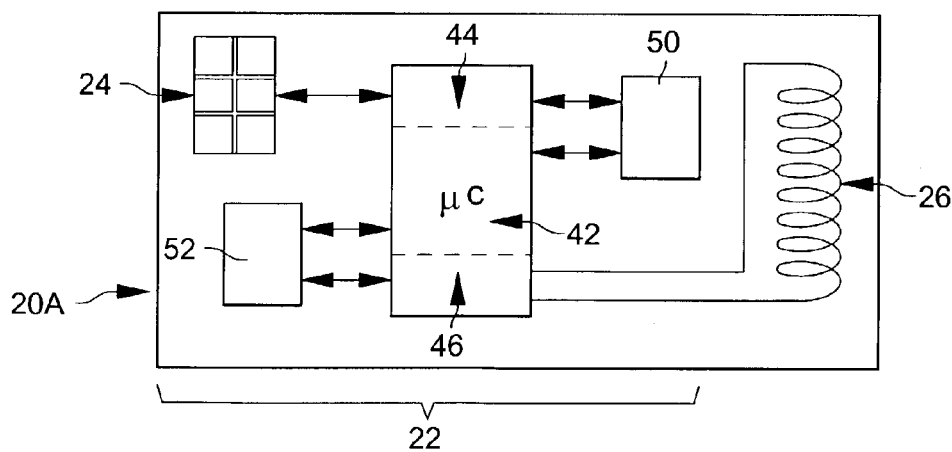

COMMUNICATION DEVICE FORMING AN INTERFACE BETWEEN AN ELECTRICALLY COUPLED READ HEAD IN PARTICULAR WITH CONTACT, AND AN ELECTROMAGNETICALLY COUPLED CONTACTLESS DEVICE

BACKGROUND OF THE INVENTION

The present invention concerns the field of communication between an electrically coupled read head, in particular resistive or possibly capacitive, and an electromagnetically coupled contactless device, particularly in the field of radio waves or light waves.

Numerous readers, in particular of the banking type or those for purchasing products or services, are electrically coupled, i.e. with coupling in proximity and especially resistive coupling. These readers are associated with electronic devices with contact pads, in particular smart cards with contacts, intended to be introduced through an opening into these readers.

However, such electronic contact devices are generally of reduced dimensions, and particularly of small thickness. This poses a first problem since the integration of data entry means or data display means is limited, so that such devices are often limited to a simple identification and sometimes to modification by readers of data comprised in memories of these contact devices. Thus, the communication of instructions or data to a reader by the contact device carrier generally occurs by means of additional units, particularly using a screen and a keyboard.

Next, such contact devices, in particular in the form of a card, can be difficult to fix to the carrier to prevent them being lost or stolen. This poses a second problem that the present invention proposes to resolve.

SUMMARY OF THE INVENTION

The present invention thus proposes to resolve the aforementioned problems and to provide means for associating an electromagnetic wave communication device with an electrically coupled reader, i.e. having a read head including electric coupling elements corresponding to (first) pads of associated electronic devices, these (first) pads having to be placed in immediate proximity and facing these coupling elements to allow communication.

The present invention thus concerns a communication device forming a removable interface between an electrically coupled integrated circuit (IC) card reader and electromagnetically coupled portable electronic devices, of the personal type, this interface comprising on the one hand electric contact (second) pads also corresponding to the coupling elements of said reader and, on the other hand, means for transmitting and/or receiving radio waves arranged to allow communication with said portable electronic devices, this interface further comprising means for managing data transfers between said electric coupling (second) pads and said electromagnetic wave transmitting and/or receiving means so as to allow communication between said reader and at least one of said electronic devices.

In a preferred embodiment, the contactless portable electronic device is integrated in an object which can be worn on a user's wrist, in particular in a watch. However, the present invention is not limited to the preferred case in which the contactless electronic devices can be fixed to a part of the body of the persons wearing such devices, but also to other types of commonly used devices, particularly mobile telephones, portable micro-computers or personal digital assistants, for example of the electronic diary type. It will be noted here that the use of a watch as a receptacle for the contactless electronic device is distinct from these last examples in that a watch resolves the second problem posed hereinbefore, whereas a mobile telephone or a portable micro-computer generally do not answer this second problem unless they are integrated in a device able to be fixed to a part of the body of a user and more particularly to his wrist.

As a result of the features of the present invention, it is possible to communicate with an electrically coupled reader requiring the presence of electric contact pads for the associated electronic device and an electromagnetically coupled electronic device allowing the device to communicate at a certain distance from a reader without any introduction of any part of this contactless electronic device into the reader.

BRIEF DESCRIPTION OF THE DRAWING

Various embodiments and particular features of the communication device according to the invention will be described in more detail hereinafter in conjunction with the following description, made with reference to FIGS. 1 and 2, which are given by way of non-limiting example and in which:

FIG. 1 shows schematically a communication device according to the invention forming a communication interface between a contact card reader associated with a computer and a watch including a contactless electronic communication device associated with an electromagnetic wave receiving and/or transmitting antenna;

FIG. 2 is a diagram showing the internal structure of an embodiment of the communication device according to the invention.

DETAILED DESCRIPTION OF THE INVENTION

With reference to FIGS. 1 and 2 an embodiment of the invention will be described hereinafter, followed by several variants.

FIG. 1 shows a computer 2 associated with a screen 4, a keyboard 6 and a mouse 8. This set of elements can form, in particular, a personal computer. Computer 2 is linked to a card reader 10 having an aperture 12 for the insertion of electronic cards. It will be noted that elements 2 and 10 can together form a single unit in which elements 4, 6 and even 8 can be integrated in the form of a control ball or touch sensitive pad.

Communication device 20, which forms the subject of the present invention, forms a removable interface one part 22 of which has the electric contact (second) pads 24. This part 22 can be introduced into aperture 12 of reader 10 so as to bring contact pads 24 face to face with a read head arranged to allow resisitive coupling with these pads 24.

Interface 20 also includes an electromagnetic antenna 26, formed in particular by a coil, and an electronic managing unit 28 for data transfer between electric contact pads 24 and antenna 26.

Antenna 26 allows electromagnetic waves, defining electromagnetic signals corresponding to data or instructions, to be transmitted and/or received. These data or instructions are received and/or provided by a contactless electronic device 30 formed of a data and/or instruction processing unit 32 associated with a second electromagnetic antenna 34. Antennae 26 and 34 are arranged so as to be able to exchange electromagnetic signals between each other. The contactless electronic device is arranged in a watch 36 having a wristband 38 allowing it to be secured to a user's wrist.

Electronic unit 32 for processing data received from reader 10 via communication interface 20 is arranged in a conventional manner for processing various instructions or data and also, if required, for providing the reader with data contained in memories, in particular a user identification code.

FIG. 2 shows a communication device 20A forming a particular embodiment of communication interface 20 shown in FIG. 1.

Communication interface 20A includes an electronic data transfer managing unit formed of a micro-controller 42, which is associated, on the one hand, with an interface circuit 44 between this micro-controller and pads 24. On the other hand, this micro-controller is associated with an electromagnetic wave transceiver circuit 46 via antenna 26. Micro-controller 42 and circuit 44 are associated with a first buffer memory 50 allowing the data received from the reader via pads 24 to be momentarily stored before they are processed by micro-controller 42, or data processed by the micro-controller and originating from antenna 26 to be momentarily stored before being transmitted to the reader via pads 24. A second buffer memory 52 is also provided, in which data originating from transceiver circuit 46 are momentarily stored before being processed by micro-controller 42, or data originating from the reader and processed by the micro-controller before circuit 46 sends them, via antenna 26, to the electronic device for which the data is intended.

In a particular case in which the communication protocol of the reader corresponds to the communication protocol of contactless electronic device 30, micro-controller 42 can only be formed by an electronic circuit assuring the transfer of electric signals between interface circuit 44 and transceiver circuit 46, if necessary in both communication directions. In such case, no particular processing is provided for the electric signals in interface 20, 20A. The presence of buffer memories may theoretically be omitted, although in practice is preferable to have at least one such memory available especially for possible synchronisation problems between the electric signal transfers at contact pads 24 and at electromagnetic antenna 26. At least one such buffer memory becomes necessary in the event that the electric signal transmission frequency between the reader and micro-controller 42 is different from the corresponding electric signal transmission frequency between the micro-controller and antenna 26. In the latter case, the micro-controller is responsible for managing the addressing of the buffer memories provided and in particular the difference in flux of the electric signals entering and leaving the communication device according to the invention.

It will be noted however that the communication protocols via electric contact pads or via an electromagnetic antenna are generally different, given the different nature of the data transmission. Thus, the present invention proposes an embodiment that improves that described hereinbefore allowing communication between an electrically coupled reader and an electronic electromagnetically coupled contactless device. In this embodiment, micro-controller 42 is arranged to process the received electric signals so as to generate on the one hand, electric signals compatible with the communication protocol via pads 24 and, on the other hand, to generate electric signals compatible with the communication protocol via antenna 26. At least three particular variants presented hereinafter can be distinguished.

In a first variant, only the format of the data is different between two intervening communication protocols. In this case, micro-controller 42 includes means for changing the format of data entering the interface according to the invention so as to put this data into a format corresponding to the communication protocol of the data leaving the interface. Calling the communication protocol between micro-controller 42 and a reader via pads 24 the first communication protocol, and calling the communication protocol between micro-controller 42 and an electronic communication contactless device via antenna 26 the second communication protocol, micro-controller 42 is arranged to reformat the received data in accordance with the first or second communication protocol to put them into the format corresponding respectively to the second or first communication protocol.

In a second variant, the encoding of the data provided in the first and second communication protocols is different. In this case, micro-controller 42 includes means for decoding the incoming data in accordance with the first or second communication protocol and for then encoding this data in accordance with the second, or respectively the first communication protocol.

In a third variant, at least one of the first and second communication protocols provides a secure data transfer. In order to do this, the data is encrypted in accordance with a determined algorithm. In this case, micro-controller 42 includes means for decrypting the incoming data in accordance with said secure communication protocol. Further, micro-controller 42 also includes means for encrypting data intended to be transmitted from the output of the interface according to the invention by said secure interface. In the event that the first and second communication protocols are secured in accordance with different algorithms, micro-controller 42 is arranged for decrypting first of all the incoming data in the interface in accordance with the first or second communication protocol and for then encrypting the data in accordance with the second, or respectively the first communication protocol before providing this data at the interface output.

The invention claimed is:

1. A communication device forming a removable interface between a reader of integrated circuit cards, which are equipped with first electric coupling pads, and electromagnetically-coupled portable electronic contactless devices, said reader having electric coupling elements for electrically contacting said first electric coupling pads when any one of said integrated circuit cards is introduced into an aperture of the reader, said removable interface including, on the one hand, second electric coupling pads corresponding to said first electric coupling pads and located on a part of said removable interface which is arranged for being introduced into said aperture of said reader, and thus allowing resistive coupling of said electric coupling elements with said second electric coupling pads, said removable interface including, on the other hand, transmitting and/or receiving means for radio waves arranged to allow communication with said portable electronic contactless devices, and said removable interface further including managing data transfer means between said second electric coupling pads and said transmitting and/or receiving means so as to enable communication between said reader and said portable electronic contactless devices.

2. A communication device according to claim 1, wherein said data transfer managing means include at least one buffer memory enabling the data to be momentarily stored during transfer between said second electric coupling pads and said transmitting and/or receiving means for electromagnetic waves.

3. A device according to claim 2, wherein the data receiving frequency by the device is different from the re-sending frequency of said data.

4. A device according to claim 2, wherein a first communication protocol between said data transfer means and said second electric coupling pads is different from a second communication protocol between these data transfer means and said transmitting and/or receiving means for electromagnetic waves.

5. A device according to claim 4, wherein said data transfer means include means for changing the format of the incoming data and corresponding to said first or second communication protocol into another format corresponding respectively to the second or first communication protocol.

6. A device according to claim 5, wherein said data transfer means include means for decoding the incoming data according to said first or second communication protocol and for then encoding this data in accordance with said second or respectively first communication protocol.

7. A device according to claim 6, wherein said data transfer means also include means for decrypting the incoming data according to said first or second communication protocol.

8. A device according to claim 7, wherein said data transfer means also include means for encrypting the data received according to said second, respectively first communication protocol before transmitting them from the output in accordance with said second, respectively first protocol.

9. A device according to claim 2, including an electronic unit formed of a micro-controller and two buffer memories arranged for receiving respectively the incoming or outgoing data through said second electric coupling pads and the incoming or outgoing data through said transmitting and/or receiving means for electromagnetic waves.

10. A device according to claim 1, wherein at least a part of this device takes the form of a banking type card carrying said second electric coupling pads, this part being intended to be introduced into an aperture of said reader.

11. A device according to claim 1, wherein said second electric coupling pads are contact pads allowing resistive coupling with said reader.

12. A device according to claim 1, wherein each electronic contactless device is arranged in a portable object able to be fixed to a part of the body of a person wearing it.

13. A device according to claim 12, wherein said portable object is a watch.

14. A device according to claim 1, wherein each electronic contactless device is arranged in a mobile telephone.

15. A device according to claim 1, wherein each electronic contactless device is arranged in a portable microcomputer or a personal digital assistant.

* * * * *